(12) United States Patent
Johansson

(10) Patent No.: US 9,982,804 B2
(45) Date of Patent: May 29, 2018

(54) INSERT BLOCK HALF

(71) Applicant: MCT Brattberg AB, Karlskrona (SE)

(72) Inventor: Bengt Johansson, Karlskrona (SE)

(73) Assignee: MCT BRATTBERG AB, Karlskrona (SE)

( * ) Notice: Subject to any disclaimer, the term of this patent is extended or adjusted under 35 U.S.C. 154(b) by 0 days. days.

(21) Appl. No.: 14/877,101

(22) Filed: Oct. 7, 2015

(65) Prior Publication Data

US 2016/0097470 A1    Apr. 7, 2016

(30) Foreign Application Priority Data

Oct. 7, 2014   (SE) ...................... 1451192

(51) Int. Cl.
| | | |
|---|---|---|
| *H02G 15/013* | (2006.01) | |
| *F16L 5/02* | (2006.01) | |
| *H02G 3/22* | (2006.01) | |
| *F16L 5/14* | (2006.01) | |
| *F16L 5/04* | (2006.01) | |

(52) U.S. Cl.
CPC ................... *F16L 5/02* (2013.01); *F16L 5/14* (2013.01); *H02G 3/22* (2013.01); *H02G 15/013* (2013.01); *F16L 5/04* (2013.01)

(58) Field of Classification Search
CPC . F16L 5/10; F16L 5/02; H02G 15/013; H02G 3/22; H05K 9/0018
See application file for complete search history.

(56) References Cited

U.S. PATENT DOCUMENTS

| | | | | |
|---|---|---|---|---|
| 569,247 | A * | 10/1896 | Smith ................... | E03D 11/16 210/450 |
| 3,282,544 | A * | 11/1966 | Brattberg ............... | F16L 3/227 248/56 |
| 3,458,163 | A * | 7/1969 | Egerton-Smith ....... | H02G 3/32 174/155 |
| 4,117,259 | A * | 9/1978 | Giebel ................ | G02B 6/4445 174/78 |
| 5,435,506 | A * | 7/1995 | Wiley .................... | F16L 3/10 248/74.1 |

(Continued)

FOREIGN PATENT DOCUMENTS

| | | |
|---|---|---|
| CN | 201844123 U | 5/2011 |
| CN | 102292889 A | 12/2011 |

(Continued)

OTHER PUBLICATIONS

Corresponding Chinese application, application No. 201510645824.9, Chinese Office action dated Apr. 27, 2017, 6 pages.

*Primary Examiner* — Eugene G Byrd
(74) *Attorney, Agent, or Firm* — Cooper Legal Group LLC; Ronald Kachmarik

(57) ABSTRACT

An insert block half for sealing around a cable, pipe or wire. The insert block half comprises: a body with a first and a second end, a first side intended to be arranged towards a substantially identical insert block half, and a semi-circular groove arranged in said first side and extending between the first and second end; and a reinforcement element having a shape corresponding to the shape of the semi-cylindrical groove and arranged to enclose the groove.

11 Claims, 4 Drawing Sheets

(56) References Cited

U.S. PATENT DOCUMENTS

| | | | | |
|---|---|---|---|---|
| 6,182,930 B1 * | 2/2001 | Lindborg | ................ | H02G 3/22 248/49 |
| D729,746 S * | 5/2015 | Millevik | ...................... | D13/155 |
| 2004/0049881 A1 * | 3/2004 | Beele | ........................ | F16L 5/10 16/2.1 |
| 2004/0103600 A1 * | 6/2004 | Broder | ..................... | F16L 5/08 52/220.8 |
| 2007/0199728 A1 * | 8/2007 | Hedstrom | ................ | F16L 5/08 174/50.5 |
| 2009/0130891 A1 * | 5/2009 | Milton | ..................... | H02G 3/22 439/373 |
| 2011/0018210 A1 * | 1/2011 | Beele | ........................ | F16L 5/10 277/606 |
| 2011/0248453 A1 * | 10/2011 | Johansson | ................. | F16L 5/08 277/602 |
| 2012/0007315 A1 * | 1/2012 | Worley | .................... | F16L 5/10 277/314 |
| 2012/0013079 A1 | 1/2012 | Andersson et al. | | |
| 2013/0187013 A1 * | 7/2013 | Minami | ............... | B64D 37/005 248/70 |
| 2013/0328271 A1 * | 12/2013 | Kurz | ........................ | H02G 3/22 277/314 |
| 2014/0326498 A1 * | 11/2014 | Romano | ............. | H02G 15/013 174/652 |
| 2016/0076673 A1 * | 3/2016 | Rule | ...................... | C09J 7/0203 156/187 |

FOREIGN PATENT DOCUMENTS

| | | | |
|---|---|---|---|
| JP | 9107189 | * | 4/1997 |
| JP | 2710767 B2 | * | 2/1998 |
| WO | 20100902581 A1 | | 8/2010 |

\* cited by examiner

INSERT BLOCK HALF

FIELD OF THE INVENTION

The present invention relates to an insert block half for sealing around a cable, wire or pipe, and an insert block comprising two of said insert block halves.

BACKGROUND OF THE INVENTION

Within many different technical fields, like for example merchant ships, offshore platforms and buildings with content of high importance there are several safety aspects that must be considered to avoid severe damages to the content within the structure as well as peoples working in or close to the area in case of accidents like for example fire or leaking water from the outside or within the platform, ship or building.

In case of explosion, fire or leaking water the fire and/or leaking water are often spread along wires, cables or pipes and in order to stop, or at least delay, the fire or water from spreading each cable, wire or pipe is sealed where they are lead through partition walls within the platform, ship or building.

One frequently used sealing system that is frequently used to provide a reliable sealing of cables, wires or pipes extending through partition walls involves a metal frame permanently installed in the wall to provide a passage of a predetermined size for the cables, wires or pipes in the desired area of the wall. The cables, wires or pipes are during installation lead through the frame. The space within the frame is during installation of the sealing filled with insert blocks packed in layers within the frame to completely fill the space within the frame. Each insert block consist of two block halves each provided with a semi-circular groove in one side of the block half such that a circular passage is generated through the insert block when the two block halves are put together. Each cable, wire or pipe extending through the frame is fitted in an insert block and packed within the frame. The outside dimension of the insert blocks is selected so that a predetermined number of insert blocks have a size corresponding to the space within the frame. After the blocks are packed side by side in layers in the intended position a pressure applying device is arranged in the top part of the frame. The pressure applying device, upon activation, applies a pressure on the blocks to press the blocks together and provide the desired sealing around the cables, wires or pipes within the frame.

However, in order to achieve the desired sealing the diameter of the passage in the insert block must correspond to the diameter of the cable, wire or pipe. The desired tight fitting is either achieved by using a number of insert blocks with different diameters of the passage or by an insert block with a larger passage and a number of peelable layers arranged in the groove such that a selected number of layers could be removed and the diameter of the passage adapted to each of the different cables, wires or pipes extending through the frame.

Recently, installation of the above described sealing system in combination with a new type of cable was initiated. The new cable is intended for optical fibres and comprises a number of small pipes extending within the cable. In order not to damage the optical fibres during the installation work of the cable, the fibres are preferably introduced in their respective pipe at a later stage when the installation work of the cable is completed by blowing the fibres and air through the pipes. Unfortunately, the pressure applied by the sealing system to seal the space around the insert blocks within the frame resulted in deformations of the cable and the small pipes within the cable which made it difficult to introduce the optical fibres.

There is consequently a need for an improved insert block, and sealing system, that ensures the desired sealing around the cable, or cables, without affecting the possibilities to introduce the optical fibres in the respective pipe.

SUMMARY OF THE INVENTION

The present invention, defined in the appended claims, relates to a inset block half, an insert block and the use of an insert block for sealing a cable, pipe or wire extending through a partition wall.

The insert block half according to the invention comprises: a body with a first and a second end, a first side intended to be arranged towards a substantially identical insert block half, and a semi-circular groove arranged in said first side and extending between the first and second end; and a reinforcement element having a shape corresponding to the shape of the semi-cylindrical groove and arranged to enclose the cable, pipe or wire.

The insert block formed when two insert block halves according to the invention are fitted around a cable, wire or pipe solves, or at least reduce, the problems defined above since the reinforcement element enclosing the groove prevent deformation of the groove, and consequently cable, when pressure is applied on the insert block to seal the gaps between insert blocks, cables and frame of the sealing system.

In one embodiment of the insert block half, the reinforcement element is made of a metal material, and the body is made of a rubber composition. A reinforcement element made of a metal material is rigid and is able to withstand the loads applied on the insert block when pressure is applied on the insert block. The material should furthermore be able to withstand high temperatures to provide the required resistance to fire. Other materials such as carbon or glass fibre laminate structures could be used as an alternative. Insert block halves have been made of different types of rubber compositions for a long period of time since the material provide excellent sealing capabilities and is able to withstand high temperatures and in combination with the rigid reinforcement element of a metal material the insert block will be able to withstand high loads without deforming the groove.

In one embodiment of the insert block half, the groove extend along an axis A and the reinforcement element, in the plane transverse to the axis A, has the shape of a half circular arc with a radius corresponding to the semi-cylindrical shape of the groove such that the reinforcement element fit in the groove. This embodiment of the reinforcement element provides a reinforcement of the groove that is able to withstand high loads since the reinforcement element of the two insert block halves form a circle that enclose the cable and prevents deformation of the cable fitted in the groove of the insert block.

In one embodiment of the insert block half, a layer of the same rubber composition as the body is arranged on the side of the reinforcement layer that is facing the cable, pipe or wire. The rubber composition layer improves the sealing between the outside surface of the cable and the inner surface of the insert block half.

In one embodiment of the insert block half, a number of peelable layers are arranged on the reinforcement element to make it possible for the operator to select the desired radius of the groove to provide a perfect fit between the cable and groove.

In one embodiment of the insert block half, the reinforcement element is arranged in a recess extending around the groove in the body such that the reinforcement element is enclosing the groove. This is an alternative embodiment to the one described above. In this embodiment the recess is formed in the insert block body and the reinforcement element fitted in the recess later during the production. The recess and the reinforcement element have corresponding shapes to ensure that the reinforcement element is easily fitted in the recess. This embodiment is favourable since no additional layer is required to provide the improved sealing between the outside surface of the cable, wire or pipe and the insert block half. Furthermore the end surfaces of the reinforcement element are also enclosed by the rubber composition material which further improves the sealing between the insert block halves fitted around the cable, wire or pipe.

In one embodiment of the insert block half, the recess extend between the first and second end of the body which is favourable since the reinforcement element could be fitted from both sides of the insert block half.

In one embodiment of the insert block half, the groove extend along an axis A, and the recess and reinforcement element, in the plane transverse to the axis A, has the shape of corresponding half circular arcs with a radius exceeding the radius of the semi-cylindrical groove. The corresponding shape of the recess and the reinforcement element ensures that the element could be introduced in the recess easily. This particular shape of the reinforcement element furthermore is able to resist considerable loads without deforming which is very important to prevent deformation of the cable extending through the insert block.

In one embodiment of the insert block half, a number of peelable layers are arranged in the groove to make it possible for the operator to select the desired radius of the groove to provide a perfect fit between the cable and groove.

The invention furthermore relates to an insert block for sealing around a cable, pipe or wire comprising two insert block halves according to the definition above. The insert block halves are arranged with the grooves facing each other such that a reinforced passage is formed through the insert block.

The invention furthermore relates to the use of at least one insert blocks according to the definition above in a metal frame fitted in a partition wall for sealing of at least one cable, pipe or wire extending through said partition wall.

The different embodiment described above could of course be combined and modified in different ways without departing from the scope of the invention that will be described more in detail in the detailed description.

BRIEF DESCRIPTION OF THE DRAWINGS

Different embodiments of the insert block half according to the invention are illustrated in the appended figures.

DETAILED DESCRIPTION

Figure 1:
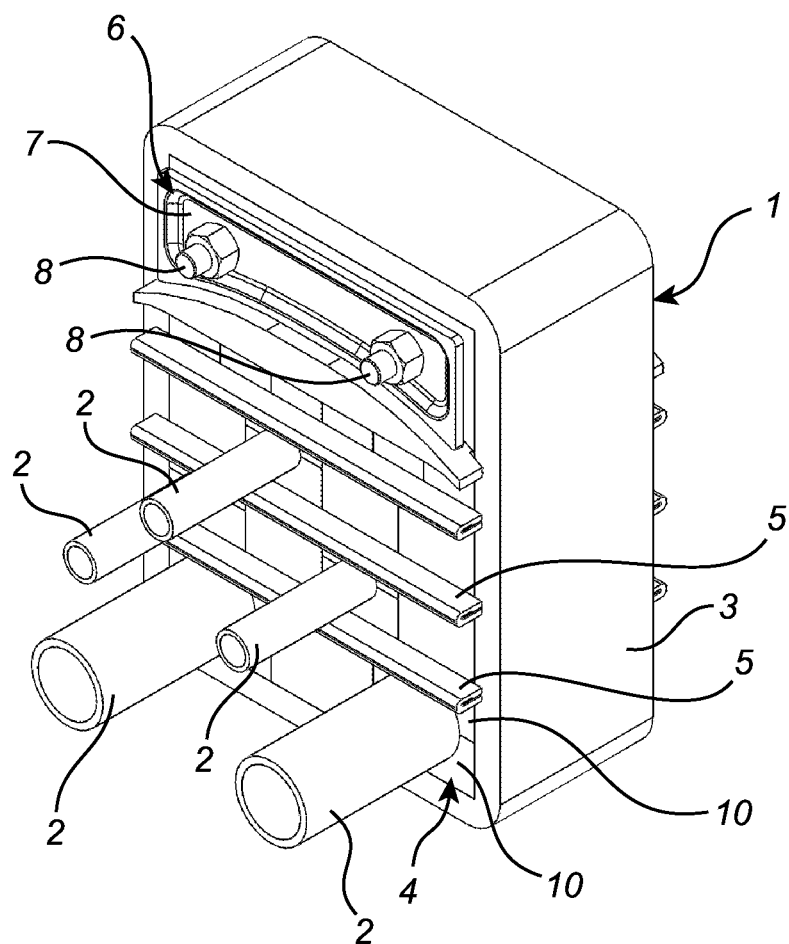
FIG. 1 illustrates at perspective view of a sealing system.

In FIG. 1 a sealing system 1 for sealing of cables 2, wires or pipes extending through a not illustrated partition wall. The system involves a metal frame 3 intended to be permanently installed in the partition wall to provide a passage of a predetermined size in the partition wall for the cables, wires or pipes extending through the partition wall. The cables, wires or pipes that need to pass through the partition wall are during installation arranged together and lead through the frame. During sealing of the frame an insert block 4, comprising two substantially identical insert block halves 10, is fitted around each of the cables, wires or pipes. The insert blocks, and the cable, wire or pipe extending through the insert block, are packed in layers within the frame to completely fill the space within the frame. The outside dimensions of the insert blocks are selected so that a predetermined number of insert blocks have a size corresponding to the space within the frame to fill the space within the frame and provide the desired sealing of the passage in the partition wall. The layers of insert blocks are separated by a guiding metal plate 5 in order to ensure that the layers remain in the intended position within the frame 3. If the number of cables, wires or pipes is less than the number of insert blocks within the frame, the insert blocks could be replaced by a solid elastic rectangular block to fill the remaining spaces within the frame.

After the blocks are packed side by side in layers in the intended position a pressure applying device 6 is arranged in the top part of the frame. The pressure applying device comprises a plate 7 arranged on each side of an elastic member and threaded shafts 8 extending through the elastic member. When the elastic member is compressed between the plates by the shafts and nuts arranged on the shaft the elastic element expand such that a pressure is applied on the layer packed within the frame 3 thereby eliminating gaps between the insert blocks and sealing the space within the frame. Different types of pressure applying devices are available and the described device could be replaced by anyone of the available devices.

Figure 2:
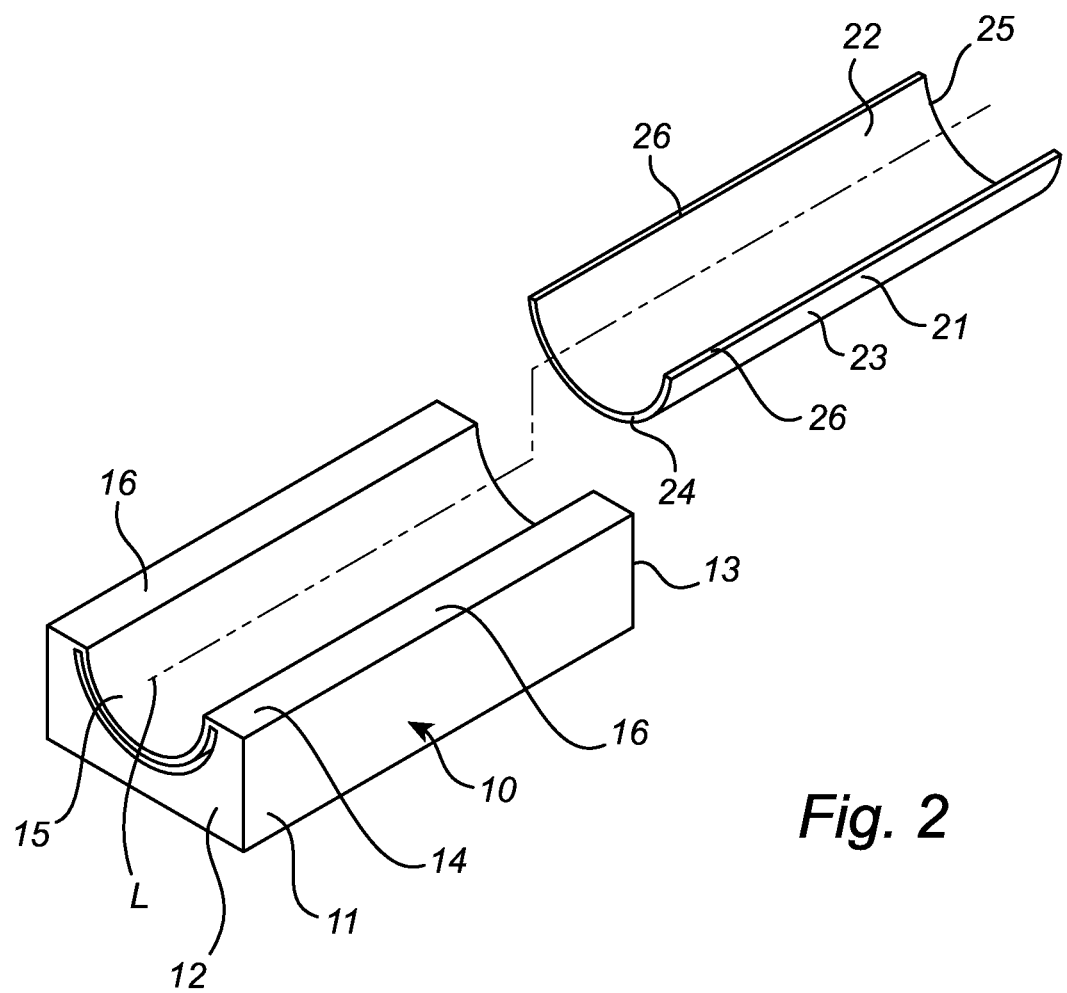
FIG. 2 illustrates an exploded perspective view of a first embodiment of an insert block half.
Figure 5:
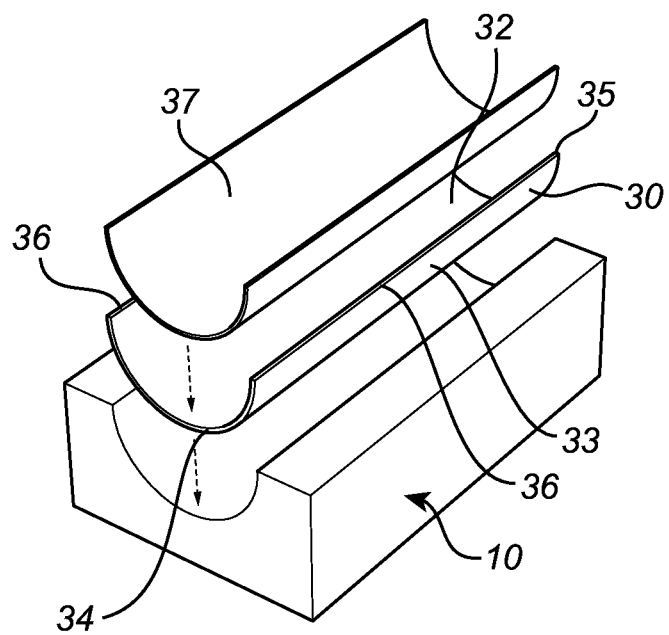
FIG. 5 illustrates an exploded perspective view of a second embodiment of an insert block half.
Figure 6:
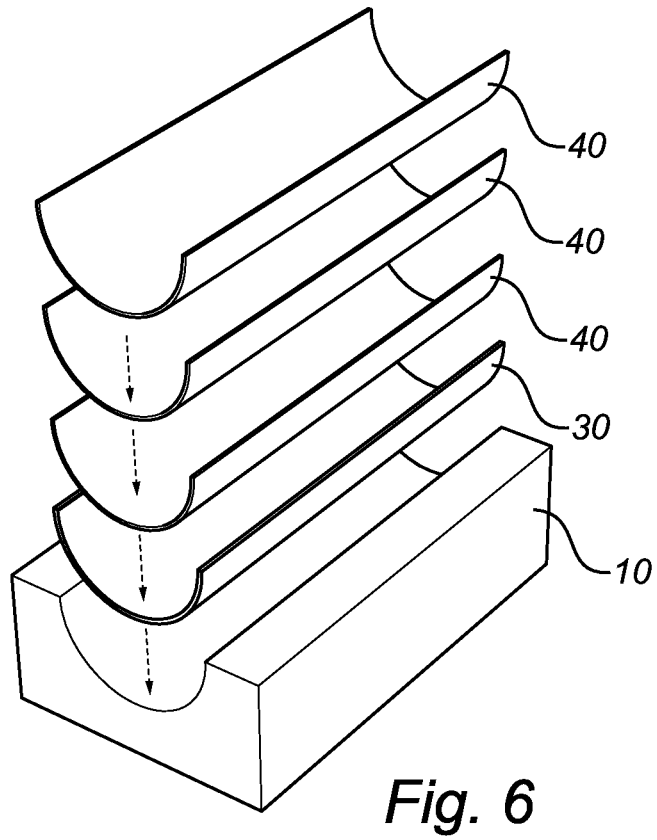
FIG. 6 illustrates an exploded perspective view of a third embodiment of an insert block half.

Each insert block consists of two insert block halves 10. Different embodiments of insert block halves are illustrated in FIGS. 2, 5 and 6. All the illustrated insert block halves comprise a rectangular body 11. The body has a first end 12 and a second end 13 arranged on opposite side of the rectangular body. In one of the substantially flat sides 14, extending from the first to the second end, a semi-cylindrical groove 15 is formed in the body such that a circular passage is generated through the insert block when two identical block halves are put together with the grooves of each insert block half facing each other.

The longitudinal central axis L of the semi-cylindrical groove is arranged parallel to the flat side 14 of the body as well as coaxial with a longitudinal central axis of the insert block formed of two identical insert block halves. The diameter of the semi-cylindrical groove is smaller than the width of the body so that an elongated contact surface 16 is formed along each side of the groove. The contact surfaces 16 of two adjacent insert block halves will be in contact with each other thereby enclosing the cable, wire or pipe arranged in the groove.

The body 11 is made of a pressure, water and heat resistant elastic rubber composition adapted to the specific demands on this type of sealing devices. The dimensions of the insert block half are preferably selected so that the insert block will have a square cross sectional shape but other shapes could be used as long at the size of the insert block corresponds to the dimensions of the frame in the partition wall. For example, insert blocks with a circular cross section could be used in a circular partition wall frame.

Figure 3:
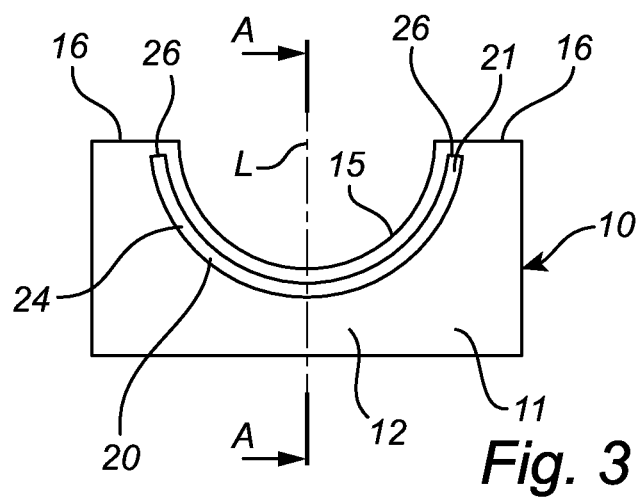
FIG. 3 illustrates a side view of the insert block half in FIG. 2 assembled.
Figure 4:
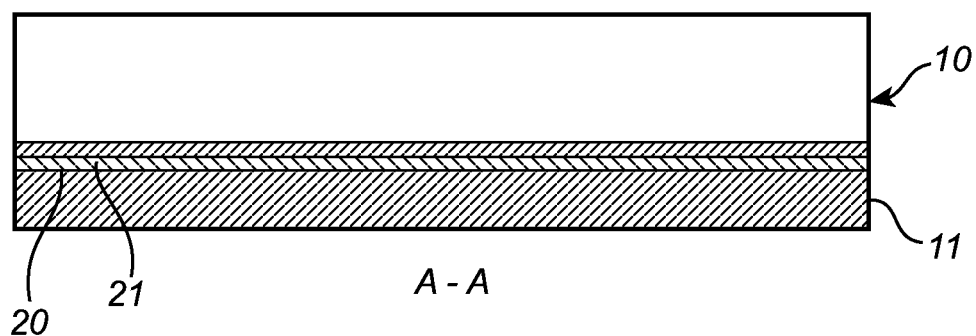
FIG. 4 illustrates a cross-sectional view of the insert block half along a vertical plane through the axis L.

In FIGS. 2, 3 and 4, different views of a first embodiment of the insert half according to the invention is illustrated. In the body of the insert block half, a recess 20 is formed. The recess extend through the entire body from the first to the second side and has the cross sectional shape, in a plane transverse to the axis L, of a circular arc with larger radius than the semi-cylindrical groove. The recess extends almost all the way to the contact surface 16, i.e. the recess extends around substantially the entire groove, but a thin piece of material remains.

The insert block half furthermore comprises a reinforcement element, made of a rigid material such as a metal material or fibre reinforced laminate structure, with a shape corresponding to the shape of the recess. In this particular embodiment the reinforcement element has a cross sectional shape, in a plane transverse to the axis L, of a circular arc with substantially the same radius as the recess such that an inside surface 22 and an outside surface 23 is generated. The reinforcement element 21 furthermore has a first side surface 24 and a second side surface 25 and two elongated surfaces 26. The reinforcement element has a length substantially equal to the length of the insert block half along axis L and the recess 20, and a substantially constant cross sectional shape along the entire length of the reinforcement element.

During installation, before the cable is fitted in the groove 15 of an insert block half 10, the reinforcement element 21 is introduced in the recess 20 such that the reinforcement element 21 encloses the groove 15. The reinforcement element 21 is arranged within the insert block half body 11 since a thin layer of the insert block body material is arranged between the inside surface 23 of the reinforcement element 21 to face the cable fitted in the groove 15. The thin layer of the elastic rubber composition improves the sealing between the insert block half 10 and the cable.

When two insert block halves 10 of the described type are fitted around a cable, the reinforcement elements 21 of the two insert block halves 10 will enclose the passage and prevent deformations of the passage when pressure is applied. The thin piece of rubber composition material between the elongated surfaces 26 of the reinforcement element 21 improves the sealing around the cable.

In FIG. 5 an alternative embodiment of an insert block half according to the invention is illustrated. The insert block body has identical design as already described above but instead of the recess formed around the groove this embodiment comprises a reinforcement element 30 fitted in the groove 15. The reinforcement element 30 has a cross sectional shape, in a plane transverse to the axis L, of a circular arc with slightly smaller radius than the radius of the groove 15 to fit in the groove 15, and an inside surface 32, an outside surface 33, a first side surface 34, a second side surface 35 and two elongated surfaces 36. In order to improve the sealing between the outside surface of the cable and the contact surface of the insert block half, a thin layer 37 of the same type of elastic rubber composition as the insert block half body is made of is applied on the inside surface 32 of the reinforcement element 30. When two insert block halves are fitted around a cable, wire or pipe, the elongated side surfaces 36 of the respective insert block half will be in contact with each other to provide a very rigid reinforcement of the passage through the insert block.

In FIG. 6, a further improved embodiment of the insert block half according to the invention is illustrated. This insert block half comprises further peelable thin layers 40 arranged on the inside surface 32 of the reinforcement element 30 in order to make it possible to adapt the radius of the passage extending through the insert block and provide the desired perfect fit between the outside surface of the cable, wire or pipe and the inside surface of the insert block. Each layer 40 has a curved shape and the size and radius of each layer is adapted to the intended position within the stack of layers in the groove 15, i.e. the radius of layers arranged closer to the groove in the body are larger than for layers closer to the centre of the groove. Furthermore the width of the layers are adapted accordingly to form substantially flat surfaces along the contact surfaces 16 of the body so that the cable, wire or pipe is enclosed by the reinforcement element 30 and the peelable layers 40 remaining in the groove and the body of the insert halves fitted around the cable, wire or pipe. The possibility to adapt the radius of the passage furthermore increase the flexibility of the insert block since the insert block is usable for cables, wires and pipes with different diameters. The peelable layers 40 could also be used in combination with the embodiment illustrated in FIGS. 2, 3 and 4.

All the described embodiments intend to provide flexible insert block halves that reduce the problems described in the background of the invention.

Furthermore, the embodiments described above could all be combined and modified in different ways without departing from the scope of the invention that is defined by the appended claims. For example the shape of the reinforcement element and the recess could be modified as long as the shape of the reinforcement element and the recess correspond to each other and provide the desired protection against deformations.

The invention claimed is:

1. An insert block half for sealing around a cable, pipe or wire, said insert block half comprising:
    an elastic body with a first and a second end, a first side intended to be arranged towards a substantially identical insert block half, a semi-circular groove arranged in said first side and extending in a length between the first and second end, and a recess extending within the body with a length from the first end to the second end; and
    a separate, rigid reinforcement element, of different material than the body, located within the recess, extending along the length of the recess from the first end to the second end and having a shape corresponding to the shape of the semi-cylindrical groove and arranged to enclose the groove.

2. The insert block half according to claim 1, wherein the reinforcement element is made of a metal material, and the body is made of a rubber composition.

3. The insert block half according to claim 1, wherein the groove extends along an axis L and the reinforcement element, in a plane transverse to the axis L, has the shape of a half circular arc with a radius corresponding to the radius of the semi-cylindrical groove such that the reinforcement element fit in the groove.

4. The insert block half according to claim 3, wherein the body is made of a rubber composition and a layer of the same rubber composition as the body is arranged on the side of the reinforcement layer that is facing the cable, pipe or wire.

5. The insert block half according to claim 2, wherein a number of peelable layers are arranged on the reinforcement element.

6. The insert block half according to claim 1, wherein the reinforcement element is arranged in a recess extending around the groove-in the body such that the reinforcement element is enclosing the groove.

7. The insert block half according to claim 6, wherein the recess extend between the first and second end of the body.

8. The insert block half according to claim 6, wherein the groove extends along an axis L, and the recess and reinforcement element, in a plane transverse to the axis L, has the shape of corresponding circular arcs with a radius exceeding the radius of the semi-cylindrical groove.

9. The insert block half according to claim 6, wherein a number of peelable layers are arranged in the groove of the insert block half.

10. An insert block for sealing around a cable, pipe or wire comprising two insert block halves according to claim 1, said insert halves are arranged with the grooves facing each other such that a reinforced passage is formed through the insert block.

11. A method of using at least one insert block in a metal frame fitted in a partition wall for sealing of at least one cable, pipe or wire extending through said partition wall, the method comprising:
   providing two inset block halves for each of the at least one insert blocks;
   providing each of the two insert block halves with:
      an elastic body with a first and a second end, a first side intended to be arranged towards the other of the two insert block halves, a semi-circular groove arranged in said first side and extending between the first and second end, and a recess extending within the body with a length from the first end to the second; and
      a separate, rigid reinforcement element, of different material than the body, located within the recess, extending along the length of the recess from the first end to the second end and having a shape corresponding to the shape of the semi-cylindrical groove and arranged to enclose the groove; and
   arranging the two insert block halves with the grooves facing each other such that a reinforced passage is formed through the at least one insert block.

* * * * *